United States Patent [19]
Dittmann et al.

[11] Patent Number: 5,908,568
[45] Date of Patent: Jun. 1, 1999

[54] METHOD AND DEVICE FOR CONTACTING THE WINDING WIRE OF A COIL

[75] Inventors: Michael Dittmann, Berlin; Erich Vojta, Hemhofen, both of Germany

[73] Assignee: Siemens Aktiengesellschaft, Munich, Germany

[21] Appl. No.: 08/836,531

[22] PCT Filed: Nov. 3, 1995

[86] PCT No.: PCT/DE95/01527

§ 371 Date: May 2, 1997

§ 102(e) Date: May 2, 1997

[87] PCT Pub. No.: WO96/14647

PCT Pub. Date: May 17, 1996

[30] Foreign Application Priority Data

Nov. 4, 1994 [DE] Germany .............................. 44 39 391
Oct. 13, 1995 [DE] Germany .............................. 195 38 231

[51] Int. Cl.[6] .................................................. B23K 9/167
[52] U.S. Cl. .................. 219/129; 219/56.22; 219/85.18; 219/85.22
[58] Field of Search .................................. 219/129, 56.1, 219/56.21, 56.22, 85.18, 85.22

[56] References Cited

U.S. PATENT DOCUMENTS

| | | | |
|---|---|---|---|
| 2,425,090 | 8/1947 | Eitel et al. | 219/129 |
| 2,903,559 | 9/1959 | Wempe . | |
| 4,039,801 | 8/1977 | Foerster et al. . | |
| 4,237,365 | 12/1980 | Lambros et al. | 219/129 |
| 4,404,456 | 9/1983 | Cann . | |

FOREIGN PATENT DOCUMENTS

| | | |
|---|---|---|
| 665 869 | 10/1965 | Belgium . |
| 0 478 161 | 4/1992 | European Pat. Off. . |
| 0 651 407 | 5/1995 | European Pat. Off. . |
| 20 63 535 | 7/1972 | Germany . |
| 23 01 094 | 7/1974 | Germany . |

*Primary Examiner*—Clifford C. Shaw
*Attorney, Agent, or Firm*—Hill & Simpson

[57] ABSTRACT

A connecting pin of a coil, which has an end section with an end section of a winding wire wound thereon with a plurality of turns, is initially provided with a drop of a fluxless soft solder and then arranged in the vicinity of the points of two opposite electrodes. An arc of a specific strength and duration is struck between the electrodes, so that the soft solder is fused and connects the winding wire to the connecting pin. The result is a fluxless soldering of the winding end in conjunction with low thermal loading of the coil former and of the connecting pin.

9 Claims, 2 Drawing Sheets

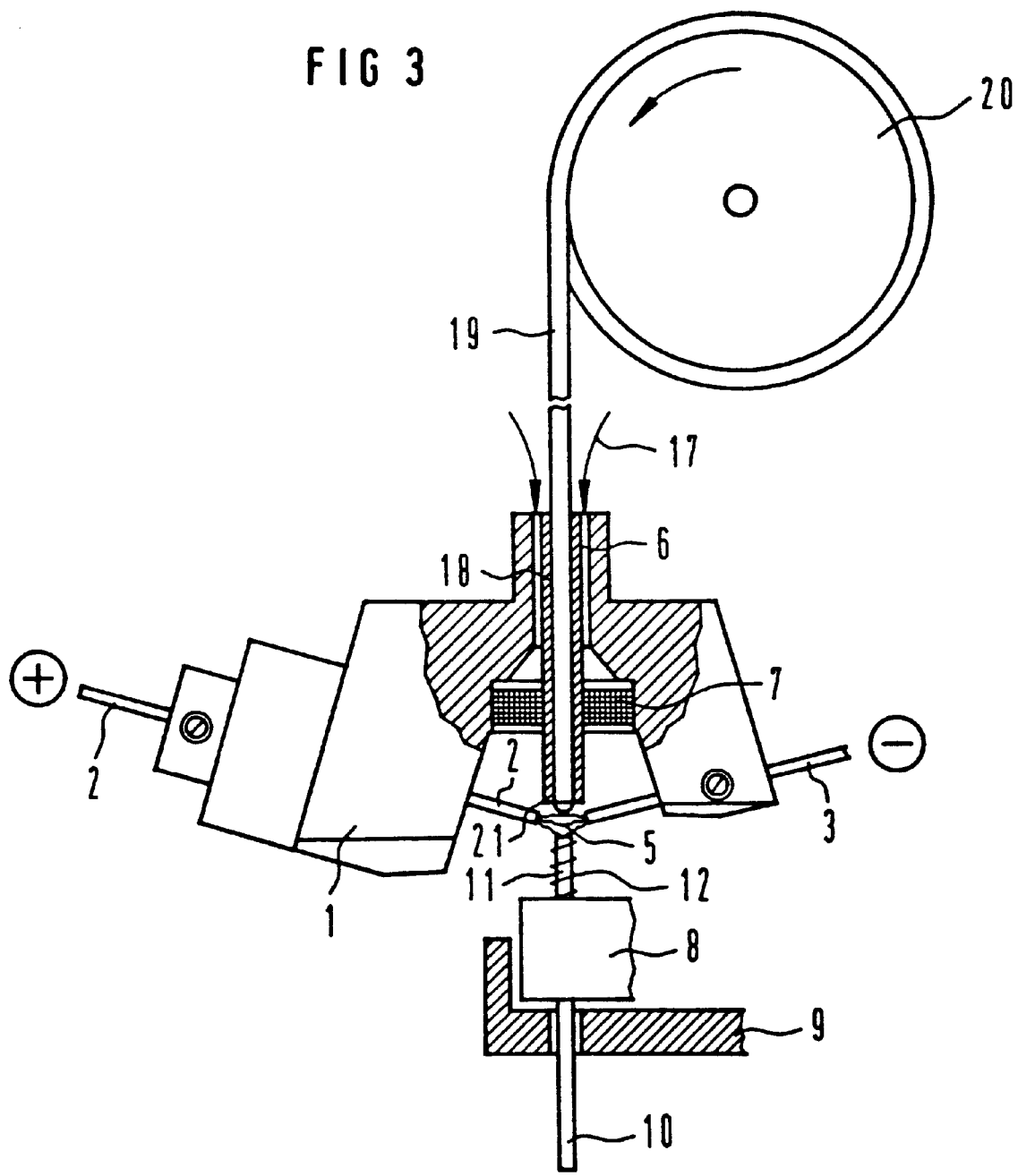

2

METHOD AND DEVICE FOR CONTACTING THE WINDING WIRE OF A COIL

BACKGROUND OF THE INVENTION

The invention relates to a method and a device for contacting the winding wire of a coil to a connecting pin by an end section of the winding wire being wound around an end section of the connecting pin using a plurality of turns, the connecting pin then being brought into contact with a fluxless soft solder and the latter finally being fused at a soldering temperature under a protective gas by feeding heat in a contactless fashion.

In order to avoid the undesired fluxes and solder baths in the production of relay coils, EP-0 651 407-A1 proposes a connection by means of a soft solder which is fused in a fluxless fashion under a protective gas. A proposed, preferred method is an arc/inert-gas soldering, which is analogous to the already known WIG welding (tungsten/inert-gas welding), and in which the connecting pin itself is not being fused together with the winding wire as in the case of the welding method, but the arc is dimensioned such that only the soft solder is liquefied. In this way, the thermal loading is significantly reduced for the coil former and the winding wire.

In the case of the WIG soldering described there, the arc is struck between the connecting pin and a counter-electrode. However, in this process problems could arise whenever, for example in the case of coils for miniature relays, connecting pins are used whose thickness is much less than 1 mm, that is to say 0.2 to 0.4 mm, for example. Such connecting pins can be contacted only with difficulty because of the correspondingly small coil dimension and their own cross-section. Under some circumstances the pins are even no longer capable of conducting the minimum current of, for example, 1A which can be generated in the case of customary WIG current sources.

SUMMARY OF THE INVENTION

The aim of the present invention is thus a further development of the WIG arc soldering such that it is also possible to solder coil connections with the smallest dimensions in a simple way and with minimum thermal loading.

According to the invention, this aim is achieved by means of a method of the type mentioned at the beginning when the wound end section of the connecting pin is arranged in the vicinity of two electrodes having their points opposite one another, and an arc is struck between the two electrodes with the strength and duration of the are being matched to the fusing of the soft solder.

Thus, the invention operates by using a so-called non-transferred arc in the case of which the arc is struck not on the connecting pin itself, but between two electrodes separated therefrom, with the result that the soft solder is fused by the radiant heat. The connecting pin itself is thus not contacted at all and, because it does not participate in the striking of the arc, it also does not require the pin to be adjusted to a precise spacing from a counter-electrode. The two electrodes themselves are set once at the correct spacing from one another and connected to the power supply, while the connecting pins of the individual coils only need to be brought close to the two electrodes while passing through before the arc is struck again. It is expedient for the end of the connecting pin to be brought between the two electrode points such that the end is approximately flush with the connecting line between the electrode points. The electrodes themselves can be at an angle to one another which can reach from approximately 0° (electrodes parallel) up to 180° (electrodes flush in a line). It has proved to be expedient to arrange the electrodes at an angle of approximately 130° to one another.

In the known method in accordance with EP-0 651 407-A1, the soft solder is provisionally applied, for example, by short-term immersion of the connecting pins in a solder bath, and then fused once again by the arc in a further operation. There is thus a need for two operations, the solder growing cold in the meantime and also being subjected in the process to oxidation, albeit slight. It is proposed in another exemplary embodiment to bring the soft solder in the form of a wire into contact with the connecting pin and to melt off the end of the wire with the arc. In this process, the wire must be withdrawn after each soldering operation with the incipiently fused end solidifying again and being subjected likewise to a certain degree of oxidation.

EP 0 478 161 B1 discloses a soldering device having a nozzle head in which the soldering flux is fused by a heat source in the interior of the nozzle head and is then applied in a liquid state onto a target surface under a protective gas via an open point. There, however, for the actual soldering operation the nozzle head has a soldering tip which is heated in a conventional way, with the result that even conventionally an additional flux is required.

In order that it is possible in the case of the method according to the invention to feed the solder in a single operation and to carry out the final soldering without interim solidification and without the possibility of interim oxidation, it is provided in a development of the method that the soft solder is brought into contact with the connecting pin in the region of the protective gas atmosphere via a heatable tube from which the solder emerges in liquid form, and that the connecting pin is then heated by the arc, as a result of which the soft solder flows into the joint region of the winding wire end section on the connecting pin.

In this way, the soft solder which is already in a liquid form is therefore brought into the protective gas region via the heated tube and then heated further by the short-term striking of the arc so that it becomes thinner and flows into the joint region of the winding connection. As already in the case of the prior art, in this case, as well, the insulation of the winding wire is burned off by the arc with the result being a good contacting. The fluxless soft solder can be introduced in this process into the heated tube in the form of a wire and fused or melted while passing through the tube at an initially sufficient temperature which is only slightly above the melting temperature of the solder.

The wound end section of the connecting pin is preferably arranged in the vicinity of the two electrodes which have their points opposite one another and between which the arc is then struck. In this way, the connecting pin itself does not need to be contacted at all and, because it does not participate in the striking of the arc, the end of the pin does not need to be adjusted to a precise spacing from a counter-electrode. The two electrodes themselves are set once at the correct spacing from one another and connected to the power supply, while the connecting pins of the individual coils only need to be brought close to the two electrodes while passing through before the arc is struck again. It is expedient for the end of the connecting pin to be brought between the two electrode points such that the end is approximately flush with the connecting line between the electrode points.

A device for carrying out the method according to the invention basically has a design as disclosed in the document DE-A-23 01 094 in conjunction with DE-A-20 63 535. The known device comprises a receptacle for a coil former with connecting pins, a holder for two bar-shaped electrodes, a flow device for feeding protective gas to the region of the two electrode points, a positioning device for in each case positioning the connecting pin of one coil former located in the receptacle with a free end of the pin at a prescribed spacing from an associated electrode point, and a power supply for the two electrodes, for the purpose of generating an arc having a prescribed strength and duration.

In this known device, however, the two electrodes are connected in parallel, with the result that two parallel arcs are struck between in each case one electrode and the opposite connecting pin. The problems associated therewith have already been explained at the beginning.

In order to carry out the method according to the invention, the device is therefore characterized in that the two electrodes are opposite one another at a prescribed spacing with their points at a prescribed angle differing from zero, in that the positioning device is set up in order to position the connecting pin at a prescribed spacing from the two electrode points in a middle region between the latter, and in that the arc is struck between the two electrodes by an appropriate circuit of the power supply.

In an expedient refinement, the device additionally has a heatable tube for feeding liquefied soft solder into the soldering region, and at least one of the electrodes being opposite the output of the heatable tube at a prescribed spacing. In a preferred embodiment, it is further provided that the heatable tube for feeding the soft solder is arranged concentrically in a feed opening for the protective gas.

The invention is explained below in more detail with reference to an exemplary embodiment with the aid of the drawing:

BRIEF DESCRIPTION OF THE DRAWINGS

FIG. 3 shows an embodiment of the arc soldering device modified with respect to FIG. 1.

DESCRIPTION OF THE PREFERRED EMBODIMENTS

Figure 1:
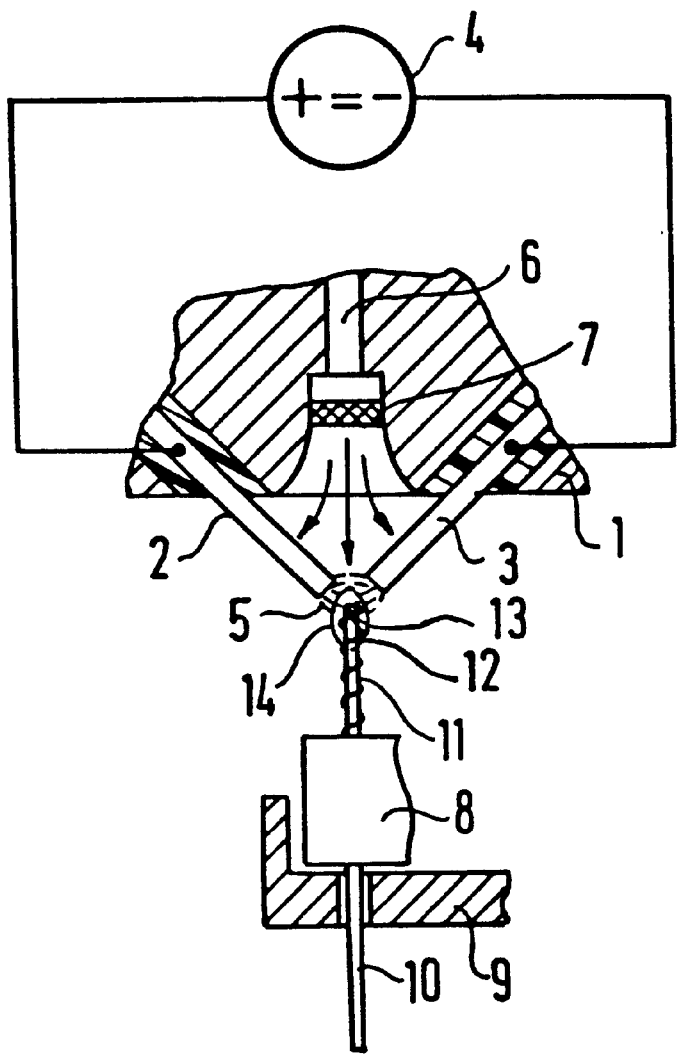
FIG. 1 shows a diagrammatic arc soldering device with portions broken away for purposes of illustration.

The arc soldering device shown diagrammatically in FIG. 1 comprises a holder 1, represented only partially, for two electrodes 2 and 3, which are fastened in an insulated fashion in the holder 1 and connected to a current source 4. A high-frequency pulse is used to strike an arc 5 briefly in each case between the electrode points with the strength and duration of the arc being set in accordance with the coil connection to be soldered. This control device is not represented, since it can be adopted from conventional welding current supplies. Protective gas, for example pure argon or argon with an admixture of, for example, 5% hydrogen ($H_2$), is blown in the direction of the arc via a flow channel 6 which has a gas filter 7.

For the purpose of protective gas soldering according to the invention, a coil former 8, of which only a small flange part is shown, is transported in a receptacle 9 in order to be machined. Anchored in the coil former 8 is a connecting pin 10 on whose end section 11 an end section 12 of a coil winding with a plurality of turns is wound. A specific amount of fluxless soft solder 14 is now applied to the free end 13 of the connecting pin 10. In accordance with the prior patent, this can preferably be performed by immersing the end section 12 in a soft solder bath whose temperature is only slightly above the melting point of the soft solder. In accordance with the representation in FIG. 1, the soft solder 14 in the form of a drop then wets the free end 13 of the connecting pin 10. The coil former 8 is now positioned by the receptacle 9 so that the free end 13 of the connecting pin 10 with the attached soft solder drop 14 is positioned between the ends of the two electrodes 2 and 3, with the result that upon striking of the arc 5 said free end is situated in the region of the radiant heat of said arc. The soft solder 14 is then fused by means of this arc and establishes reliable contact between the connecting pin 10 and the wound-on end section 12 of the winding wire. In this case, of course, the varnish insulation of the winding wire is also burned off.

Figure 2:
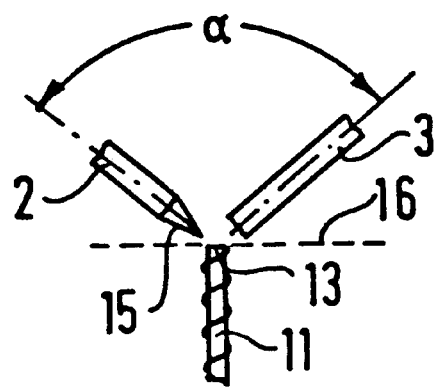
FIG. 2 shows a detailed representation of the electrode points and of a connecting pin, slightly modified with respect to FIG. 1.

The arrangement of the two electrodes 2 and 3 is shown once again in a detailed representation in FIG. 2, the anode 2 being provided in this case with a point 15. It is also shown here that the free end 13 of the end section 11 of the connecting pin 10 is arranged approximately flush with a line 16 connecting the ends or points of the electrodes 2 and 3. The spacing between the two electrodes was approximately 1.5 to 2 mm in a trial arrangement, while the angle α between the two electrodes can be varied between approximately 0° and 180° in accordance with the application. In an expedient trial arrangement, it was approximately 130°. In the practical trial, good results were obtained with an arc current of 1.0 A between the anode and cathode and an arc duration of approximately 0.1 s.

FIG. 3 shows, in a modification of FIG. 1, an arc soldering device with an integrated soldering wire feed.

Arranged in the holder 1 there in a fashion coaxial with the flow channel 6 is a heatable tube 18 which can, for example, consist of molybdenum or nickel chromium. Introduced into this heatable tube 18 from above is a fluxless soldering wire 19, which consists, for example, of L-Sn60Pb40, and which wire 19 is wound off from a coil 20 in the present example. At the lower end 21 of the tube 18, the soft solder then emerges in liquefied form, because it is possible for the temperature at the lower end 21 to be about 200° C., that is to say only slightly above the melting point of the soldering material. The lower end 21 of the tube 18 is located in the middle in the vicinity of the ends of the two electrodes 2 and 3.

In this case, in the protective-gas/arc soldering according to the invention the coil former 8 is positioned by means of the receptacle 9 such that the end 11 of the connecting pin 10 is immersed in the soft solder 19 emerging in liquid form from the tube end 21. Since this end 11 of the connecting pin 10 is seated with the liquid soft solder between the ends of the two electrodes 2 and 3, the soft solder drop is more strongly liquefied upon the striking of the arc between the two electrodes, with the result that the liquid solder flows into the joint region between the end section 11 of the connecting pin and the turns of the end section 12 of the coil winding, and connects the winding wire, stripped of insulation by the arc, to the connecting pin 10. The duration of the arc is preferably between 0.1 and 0.15 s in this case, and the welding current strength is approximately 1A, for example.

We claim:

1. A method for contacting winding wires on a coil to a connecting pin, said method comprising the steps of providing two electrodes having their points opposite one another, providing a heatable tube from which a liquid form of a soft solder emerges, providing a protective gas atmosphere in the vicinity of the two electrodes, winding an end section of a winding wire around an end section of a connecting pin using a plurality of turns to form a wound end section, arranging the wound end section of the connecting pin in the vicinity of the two electrodes, bringing a solder from the heatable tube into contact with the wound end section of the connecting pin in the region of the protective gas atmosphere and striking an arc between the two electrodes with a strength and duration of the arc being matched to the melting of the soft solder so that the soft solder flows into the joint regions of the wound end section on the connecting pin.

2. A method as claimed in claim 1, which includes introducing the soft solder in the form of a wire into the heatable tube and melting the wire in the tube while passing therethrough.

3. A method as claimed in claim 1, which includes appropriately setting the heating in the tube so that the emerging soft solder has a temperature which is only slightly above the melting temperature of the solder.

4. A method as claimed in claim 1, wherein the step of arranging the wound end section of the connecting pin in the vicinity of two electrodes having their points opposite one another, and the step of striking an arc between the two electrodes with a strength and duration being matched so that the soft solder flows into the joint region of the end section of the winding wire.

5. A method as claimed in claim 1, wherein for the purpose of soldering, the step of arranging the connecting pin locates the free end of the pin between the ends of the two electrodes approximately on a line extending between the two electrodes.

6. In a device for soldering winding ends to connecting pins of a coil, said device having a receptacle for a coil former with connecting pins, a holder for two bar-shaped electrodes with electrode points forming a soldering region, a flow device for feeding a protective gas to the region of the two electrode points, a positioning device for in each case positioning the connecting pin of one coil former located in the receptacle with a free end at a prescribed spacing from an associated electrode point, and a power supply for the two electrodes, for the purpose of generating an arc having a prescribed strength and duration in the soldering region, the improvements comprising a heatable tube for feeding liquefied soft solder into the soldering region, the positioning device respectively bringing a connecting pin of a coil former located in the receptacle into contact with the liquid soft solder at an output opening of the heatable tube, and the two electrodes being opposite one another at a prescribed spacing with their points at a prescribed angle $\alpha$ differing from zero, the positioning device being set up in order to position the connecting pin at a prescribed spacing from the two electrode points in a middle region between the points and the arc being struck between the two electrodes by an appropriate circuit of the power supply.

7. In a device as claimed in claim 6, wherein the angle $\alpha$ is between 10° and 180°.

8. In a device as claimed in claim 7, wherein the angle $\alpha$ is approximately 130°.

9. In a device as claimed in claim 6, wherein the heatable tube is arranged concentrically inside a feed channel for the protective gas.

* * * * *